(12) United States Patent
Roberts

(10) Patent No.: US 7,554,224 B2
(45) Date of Patent: Jun. 30, 2009

(54) ELECTROMECHANICAL GENERATOR FOR CONVERTING MECHANICAL VIBRATIONAL ENERGY INTO ELECTRICAL ENERGY

(75) Inventor: Stephen Roberts, Hampshire (GB)

(73) Assignee: Perpetuum Ltd., Southampton (GB)

( * ) Notice: Subject to any disclaimer, the term of this patent is extended or adjusted under 35 U.S.C. 154(b) by 311 days.

(21) Appl. No.: 11/361,893

(22) Filed: Feb. 22, 2006

(65) Prior Publication Data

US 2007/0194634 A1  Aug. 23, 2007

(51) Int. Cl.
 *H02K 35/00* (2006.01)
 *H02K 35/02* (2006.01)
(52) U.S. Cl. ............... 310/15; 310/17; 310/23; 310/36; 290/1 R
(58) Field of Classification Search ........... 310/15, 310/17, 20, 23, 36; 290/1 R
 See application file for complete search history.

(56) References Cited

U.S. PATENT DOCUMENTS

| | | | |
|---|---|---|---|
| 3,463,946 A * | 8/1969 | Zimmerman | 310/15 |
| 3,553,726 A | 1/1971 | Zimmerman | |
| 4,692,673 A * | 9/1987 | DeLong | 318/132 |
| 5,554,922 A * | 9/1996 | Kunkel | 322/3 |
| 6,768,230 B2 | 7/2004 | Cheung et al. | |
| 6,930,848 B1 * | 8/2005 | Codilian et al. | 360/69 |
| 7,023,112 B2 | 4/2006 | Miyamoto et al. | |
| 2004/0104625 A1 * | 6/2004 | Wakuda et al. | 310/15 |
| 2007/0040457 A1 * | 2/2007 | Shimizu et al. | 310/15 |

FOREIGN PATENT DOCUMENTS

| | | |
|---|---|---|
| DE | 102004054749 A1 | 6/2006 |
| GB | 2311171 A | 9/1997 |
| JP | 11-032470 A | 2/1999 |
| JP | 11032470 A | 2/1999 |
| JP | 2002-374661 A | 12/2002 |
| WO | 99-46503 A | 9/1999 |
| WO | 2005/057760 A1 | 6/2005 |

OTHER PUBLICATIONS

JPO machine translation, Shinichi JP 11032470, Detailed Description, Feb. 2, 1999.*
UK Patent Office "Combined Search and Examination Report under Sections 17 and 18(3)" dated Nov. 17, 2006, issued for priority application, UK Serial No. GB0614555.1.
PCT Office "International Search Report and Written Opinion under PCT Article 18 and Rules 43 and 44" dated Jun. 19, 2007, issued for priority application, PCT/GB2007/000604.

* cited by examiner

*Primary Examiner*—Burton Mullins
(74) *Attorney, Agent, or Firm*—Colin P. Cahoon; James R. Gourley; Carstens & Cahoon, LLP

(57) ABSTRACT

An electromechanical generator comprising an electromechanical device for converting mechanical vibrational energy into electrical energy, the electromechanical device comprising a housing, an electrically conductive coil fixedly mounted in the housing, a magnet assembly movably mounted in the housing for linear vibrational motion along an axis, the magnet assembly having a pair of opposed polar surfaces defining a gap therebetween, the coil being disposed in the gap, and a biasing device mounted between the housing and the magnet assembly, the biasing device biasing the magnet assembly in opposed directions along the axis towards a central position.

34 Claims, 5 Drawing Sheets

ELECTROMECHANICAL GENERATOR FOR CONVERTING MECHANICAL VIBRATIONAL ENERGY INTO ELECTRICAL ENERGY

BACKGROUND TO THE INVENTION

1. Technical Field

The present invention relates to an electromechanical generator for converting mechanical vibrational energy into electrical energy. In particular, the present invention relates to such a device which is a miniature generator capable of converting ambient vibration energy into electrical energy for use, for example, in powering intelligent sensor systems. Such a system can be used in many areas where there is an economical or operational advantage in the elimination of power cables or batteries.

2. Description of the Prior Art

There is currently an increasing level of research activity in the area of alternative power sources for wireless sensors, such devices being described in the art as being used for 'energy harvesting'.

It is known to use an electromechanical generator for harvesting useful electrical power from ambient vibrations. A typical magnet-coil generator consists of a spring-mass combination attached to a magnet or coil in such a manner that when the system vibrates, a coil cuts through the flux formed by a magnetic core. The mass which is moved when vibrated is mounted on a cantilever beam. The beam can either be connected to the magnetic core, with the coil fixed relative to an enclosure for the device, or vice versa.

The use of a cantilever beam as the spring results in a number of technical problems. First the motion of a cantilever beam about its central position is not linear. Therefore, any magnetic coupling between the magnet and the coil is not optimized unless these components are relatively complex in form.

In addition, either the coil or the magnet may be mounted for vibrational resonant motion on the cantilever beam. In either case, it is necessary for the mass that is mounted on the cantilever beam to be carefully controlled in order to ensure that the natural frequency corresponds to the designed natural frequency. For some constructions, such careful control of the mass may be difficult to achieve in practice, and can also greatly increases manufacturing costs, because of the difficulties and complications of producing a mass of the desired amount.

Furthermore, it is generally known in the art that as a rule the greater the mass of the spring-mass combination of the magnetic core generator, the greater the output electrical power. However, in practice there is difficulty loading excess mass onto a cantilever beam, while retaining not only careful control of the natural frequency but also a compact and robust structure.

The primary problem however of known electromechanical generators, in particular those incorporating cantilever beams, is that the electrical output is generally too low. This is a factor of the spring-mass combination of the magnetic-coil generator being such that only a narrow resonant bandwidth is provided around a nominal natural frequency. Accordingly, since in practice the vibration tends often to be within an even broader frequency band than the bandwidth of the device about the natural frequency, in practice the magnetic coupling is reduced as compared to the theoretical design maximum. This in turn means that the maximum voltage which can reliably be extracted from the electromechanical generator is rather low. This can, in turn, seriously restrict the operational applications of the electromechanical generator.

The two main problems of known electromechanical generators are that they produce too little electrical power output and have too narrow an operating bandwidth. Power output can be improved by increasing the moving mass within the device, but bandwidth can only be improved by increasing the electromagnetic coupling. Higher electromagnetic coupling allows more power to be extracted when the device is not operating at exactly its natural frequency.

In a paper entitled "Self-Powered Signal Processing using Vibration-based Power Generation" Amir Therarja et al, IEEE Journal of Solid-State Circuits, Vol. 33, No. 5, May 1998 the feasibility of operating a digital system from power generated by vibrations in its environment, in particular by using a moving coil electromagnetic transducer as the power generator, was explored. In laboratory experiments, an inertial electromechanical generator was proposed and a prototype made consisting of a mass connected to a helical spring with the other end of the spring being attached to a rigid housing so that mass depended downwardly on the helical spring from the rigid housing. As the housing was vibrated, the mass moved relative to the housing and energy was stored in the mass-spring system. A wire coil was attached to the mass and moved through the field of a permanent magnet B located beneath the coil as the mass vibrated. The moving coil cut a varying amount of magnetic flux and in turn induced a voltage on the coil in accordance with Faraday's law. This voltage was the electrical output of the generator and was the input of a voltage regulator.

This laboratory based model would have no utility for practical applications in the field because it would not be sufficient robust and would be, unlike the use of a cantilever beam, subject to interference by lateral vibration.

In a paper entitled "AA Sized Micro Power Conversion Cell for Wireless Applications" by Yuen et al, published in the Proceedings of the Fifth World Congress on Intelligent Control and Automation, Jun. 15-19, 2004, Hangshu, People's Republic of China, there is disclosed a prototype micropower generator having the same size and dimensions of an AA size battery. This comprised a laser-micro machine resonating spring which was spiral and planar in structure and was attached to a rare earth permanent magnet. This was mounted in an inner housing. The outer surface of the inner housing was surrounded by a coil. The magnet could vibrate up and down within a cylindrical chamber defined in the inner housing.

This device suffers from the problem that very high amplitude of vibration, is required to obtain useful power output; 250 micron vibration amplitude at 100 Hz which equates to around 10 g of acceleration amplitude (where g is the acceleration due to gravity). Also, the fabrication of the micromachined spiral spring is difficult and expensive and the paper concludes that if a spring could be designed to vibrate in a horizontal plane with rotation, rather than to vibrate in a vertical direction relative to the coil, the voltage output could be increased and the stress on the spring could be reduced.

In a paper entitled "Architecture for vibration-driven micropower generators", by Aitcheson et al, published in the Journal of Micromechanical Systems, Vol. 13, No. 3, June 2004, pp. 335-342, various electromechanical generators are disclosed. In particular, a velocity-damped resonant generator (VDRG) is disclosed which consists of a damper for extracting energy from a mass-spring system. Such a damper may consist, for example, of a magnet-coil generator, such as the combination of two magnets mounted on a keeper to form a C-shaped core with a coil placed in the air-gap between the magnets at right angles to the direction of movement of the mass on a cantilever beam.

While these prior disclosures all produce a useful mechanism for designing a theoretical electromechanical generator, when an electromechanical generator is used in a practical application, it is not possible accurately to predict the natural frequency or the optimal damping factor. The electromechanical generator is designed and set up for what is believed to be the likely operating conditions. However, there is no guarantee that the practical operating conditions correspond to the theoretical ideal used to set up the electromechanical generator for the specific application. In practice, an electromechanical generator is set up to be operable across a narrow range of likely operating conditions, in particular with the damping factor being set up so that the power output is within a range encompassing the optimal power output. However, it is very unlikely that the actual power output is optimized for the specific application. Consequently, the electromechanical generator would not operate at maximum efficiency of the conversion of mechanical vibration energy into electrical energy, and thereby into useful electrical power.

Also, the frequency of ambient vibration may change during operation. The known electromechanical generator may not be able to operate at maximum efficiency as a result of such a change.

Yet further, the damper of the electromechanical generator incorporates a sprung mass that oscillates about a central position at a frequency intended to correspond to the frequency to which the device is to be subjected in use. The amplitude of the resonant vibration depends upon a number of variables, in particular the frequency and magnitude of the driving vibration, the Q-factor of the resonator, the resonator mass and its natural frequency.

These variables are not all predictable from the actual conditions encountered when the electromechanical generator is put into use in the field to harvest energy from a vibrating body. The amplitude of vibration of the sprung mass may vary with time, in an intermittent and unpredictable manner.

SUMMARY OF THE INVENTION

The present invention aims to provide an improved electromechanical generator for converting mechanical vibrational energy into electrical energy.

The present invention also aims at least partially to overcome at least some of these problems of known electromechanical generators, in particular those incorporating a magnet-coil generator consisting of a spring mass combination in which a mass to be vibrated is mounted on a spring in the form of a cantilever beam.

The present invention further aims to provide an improved electromechanical generator in which the magnetic coupling between a magnet assembly relative to a coil can be maximized.

The present invention also aims to provide an improved electromechanical generator in which the relative linear motion of the magnet assembly relative to the coil is ensured, and lateral motion prevented.

The present invention also aims to provide an improved electromechanical generator in which the electromechanical generator can be used in any orientation.

The present invention also aims to provide an improved electromechanical generator in which the electromechanical generator provides maximum cutting of magnetic flux by the coil.

The present invention also aims to provide an improved electromechanical generator in which the natural frequency is substantially independent of amplitude of the vibration.

The present invention also aims to provide an improved electromechanical generator in which the spring characteristics are more likely to be constant over the operating lifetime of the device, thereby increasing the performance of the electromechanical generator.

The present invention also aims to provide an improved electromechanical generator in which the moving mass can be made to be very high relative to the size of the electromechanical generator, as compared for example to cantilever designs, which can maximize the electrical power output.

The present invention also aims to provide an improved electromechanical generator which is capable of producing a higher output voltage than known devices.

The present invention aims to provide an improved electromechanical generator in which, by increasing the electrical output, as a result of increased magnetic coupling, the operating band width of the device can be greatly increased.

The present invention also aims to provide an improved electromechanical generator in which the ability of the device to be used in many new energy harvesting applications is greatly enhanced.

The present invention also aims to provide an improved electromechanical generator which can be manufacture easily and reliably using simple manufacturing techniques and at low production costs.

The present invention also aims to provide an improved electromechanical generator which has a reliable and simple structure and avoids complicated, intricate and/or expensive manufacturing techniques, and the resultant structure is robust and compact.

The present invention also aims to provide an improved electromechanical generator which can be used safely in potentially flammable environments, such as on oil drilling platforms.

In a first aspect, the present invention accordingly provides an electromechanical generator for converting mechanical vibrational energy into electrical energy, the electromechanical generator comprising a housing, an electrically conductive coil fixedly mounted in the housing, a magnet assembly movably mounted in the housing for linear vibrational motion along an axis, the magnet assembly having a pair of opposed polar surfaces defining a gap therebetween, the coil being disposed in the gap, and a biasing device mounted between the housing and the magnet assembly, the biasing device biasing the magnet assembly in opposed directions along the axis towards a central position.

Preferably, the biasing device comprises a pair of springs, each spring being axially aligned with the axis and biasing the movably mounted magnet assembly in a respective one of the two opposed directions along the axis towards the central position.

More preferably, the springs comprise compression springs. However, they may comprise tension springs.

Desirably, the biasing device annularly surrounds at least a part of the magnet assembly.

Preferably, the biasing device is adapted substantially to prevent non-axial movement of the magnet assembly.

The electromechanical generator may further comprise a constraining device for limiting non-axial movement of the magnet assembly. The movement being limited so that the magnet assembly cannot contact the coil.

Preferably, the magnet assembly comprises a cylindrical magnet, and first and second bodies of ferromagnetic material each having an axis of rotation aligned with the cylindrical axis of the magnet and each being coupled to a respective pole of the magnet, the first body forming one polar surface and the second body forming the other polar surface.

More preferably, the magnet assembly further comprises a support aligned with the axis and mounted to the first body on a face thereof remote from the magnet, and the biasing device comprises first and second compression springs biasing the magnet assembly in opposed directions along the axis, the first compression spring being mounted between the first body and the housing and the second compression spring being mounted between the support and the housing.

Preferably, the housing includes a flange having opposite annular surfaces against which the first and second compression spring respectively abut.

More preferably, each compression spring has two opposed ends and each end is detachably seated in a respective annular channel of the housing or the support.

Optionally, the cylindrical magnet is received in a cavity in the first body and a first pole thereof is adjacent a bottom wall of the cavity, the second body is mounted on a second pole of the cylindrical magnet, and the gap is annular and defined between an inner cylindrical surface of the cavity and an outer cylindrical surface of the second body.

The biasing device may be detachably mounted between the housing and the magnet assembly under the action of its own bias.

Preferably, the magnet assembly is rotationally symmetric about the axis.

Preferably, the magnet assembly has an end face remote from the coil, the end face including a cavity that is aligned with, and rotationally symmetric about, the axis.

Preferably the housing has an interior volume including a gas, and further comprising a hermetic seal surrounding the housing for hermetically sealing the interior volume of the housing, and at least one vent in the moving element for equalization of gas pressure differentials within the housing volume resulting from movement of the magnet assembly along the axis.

In a second aspect, the present invention provides an electromechanical generator for converting mechanical vibrational energy into electrical energy, the electromechanical generator comprising an electrically conductive coil, a magnet assembly, the magnet assembly having a pair of opposed polar surfaces defining a gap therebetween, the coil being disposed in the gap, one of the coil and the magnet assembly being fixed and the other of the coil and the magnet assembly being movably mounted for linear vibrational motion along an axis, and a pair of springs, each spring being axially aligned with the axis and biasing the movably mounted coil or magnet assembly in a respective one of two opposed directions along the axis towards a central position.

Preferably, the magnet assembly is movably mounted and the coil is fixed. Alternatively, the coil is movably mounted and the magnet assembly is fixed.

In a third aspect, the present invention provides an electromechanical generator for converting mechanical vibrational energy into electrical energy, the electromechanical generator comprising an electrically conductive coil, a magnet assembly movably mounted for linear vibrational motion along an axis, the magnet assembly having a pair of opposed polar surfaces defining a gap therebetween, the coil being disposed in the gap, and a biasing device annularly surrounding at least a part of the magnet assembly, the biasing device biasing the magnet assembly in opposed directions along the axis towards a central position.

In a fourth aspect, the present invention provides an electromechanical generator for converting mechanical vibrational energy into electrical energy, the electromechanical generator comprising an electrically conductive coil, a magnet assembly movably mounted for linear vibrational motion along an axis, the magnet assembly having a pair of opposed polar surfaces defining a gap therebetween, the coil being disposed in the gap, and a biasing device biasing the magnet assembly in opposed directions along the axis towards a central position, the biasing device substantially preventing non-axial movement of the magnet assembly.

In a fifth aspect, the present invention provides an electromechanical generator for converting mechanical vibrational energy into electrical energy, the electromechanical generator comprising an electrically conductive coil, a magnet assembly movably mounted for linear vibrational motion along an axis, the magnet assembly having a pair of opposed polar surfaces defining a gap therebetween, the coil being disposed in the gap, a biasing device biasing the magnet assembly in opposed directions along the axis towards a central position, and a constraining device for limiting non-axial movement of the magnet assembly.

In a sixth aspect, the present invention provides an electromechanical generator for converting mechanical vibrational energy into electrical energy, the electromechanical generator comprising an electrically conductive coil, a magnet assembly movably mounted for linear vibrational motion along an axis, the magnet assembly having a pair of opposed polar surfaces defining a gap therebetween, the coil being disposed in the gap, the magnet assembly comprising a cylindrical magnet, first and second bodies of ferromagnetic material each having an axis of rotation aligned with the cylindrical axis of the magnet and each being coupled to a respective pole of the magnet, the first body forming one polar surface and the second body forming the other polar surface, and a biasing device biasing the magnet assembly in opposed directions along the axis towards a central position.

In a seventh aspect, the present invention provides an electromechanical generator for converting mechanical vibrational energy into electrical energy, the electromechanical generator comprising a housing, an electrically conductive coil fixedly mounted in the housing, a magnet assembly movably mounted in the housing for linear vibrational motion along an axis, the magnet assembly having a pair of opposed polar surfaces defining a gap therebetween, the coil being disposed in the gap, the magnet assembly comprising a magnet aligned with the axis, first and second bodies of ferromagnetic material each aligned with the axis and each being coupled to a respective pole of the magnet, the first body forming one polar surface and the second body forming the other polar surface, and a support aligned with the axis and mounted to the first body on a face thereof remote from the magnet, and first and second compression springs biasing the magnet assembly in opposed directions along the axis, the first compression spring being mounted between the first body and the housing and the second compression spring being mounted between the support and the housing.

In an eighth aspect, the present invention provides an electromechanical generator for converting mechanical vibrational energy into electrical energy, the electromechanical generator comprising an electrically conductive coil, a magnet assembly movably mounted for linear vibrational motion along an axis, the magnet assembly having a pair of opposed polar surfaces defining a gap therebetween, the coil being disposed in the gap, and a biasing device biasing the magnet assembly in opposed directions along the axis towards a central position, wherein the magnet assembly is rotationally symmetric about the axis.

In a ninth aspect, the present invention provides an electromechanical generator for converting mechanical vibrational energy into electrical energy, the electromechanical generator comprising an electrically conductive coil, a magnet assembly movably mounted for linear vibrational motion along an axis, the magnet assembly having a pair of opposed polar surfaces defining a gap therebetween, the coil being disposed in the gap, and a biasing device biasing the magnet assembly in opposed directions along the axis towards a central position, wherein the magnet assembly has an end face remote from the coil, the end face including a cavity that is aligned with, and rotationally symmetric about, the axis.

In a tenth aspect, the present invention provides an electromechanical generator for converting mechanical vibrational energy into electrical energy, the electromechanical generator comprising a housing, the housing having an interior volume including a gas, an electrically conductive coil mounted in the housing, a magnet assembly mounted in the housing, the magnet assembly having a pair of opposed polar surfaces defining a gap therebetween, the coil being disposed in the gap, the coil and magnet assembly being mounted for relative linear vibrational motion therebetween along an axis, a biasing device within the housing biasing a moving element, comprising at least one of the coil and the magnet assembly, in opposed directions along the axis towards a central position, a hermetic seal surrounding the housing for hermetically sealing the interior volume of the housing, and at least one vent in the moving element for equalization of gas pressure differentials within the housing volume resulting from movement of the moving element assembly along the axis.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

The electromechanical generator of the present invention is a resonant generator known in the art as "velocity-damped" where all of the work done by the movement of the inertial mass relative to the housing is proportional to the instantaneous velocity of that movement. Inevitably, a portion of that work is absorbed overcoming unwanted mechanical or electrical losses, but the remainder of the work may be used to generate an electrical current via a suitable transduction mechanism, such as the electrical coil/magnetic assembly described below.

Figure 1:
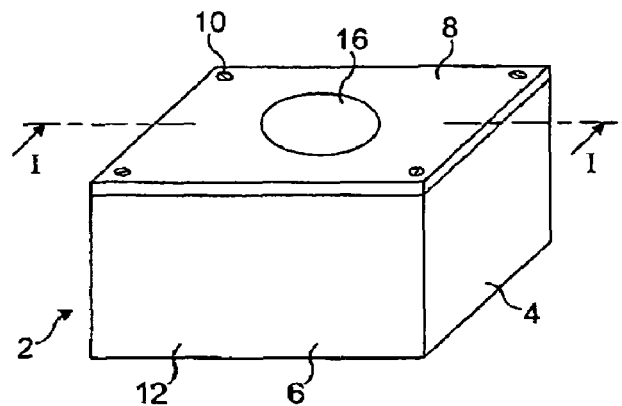
FIG. 1 is a schematic perspective view of an electromechanical generator for converting mechanical vibrational energy into electrical energy in accordance with an embodiment of the present invention.
Figure 2:
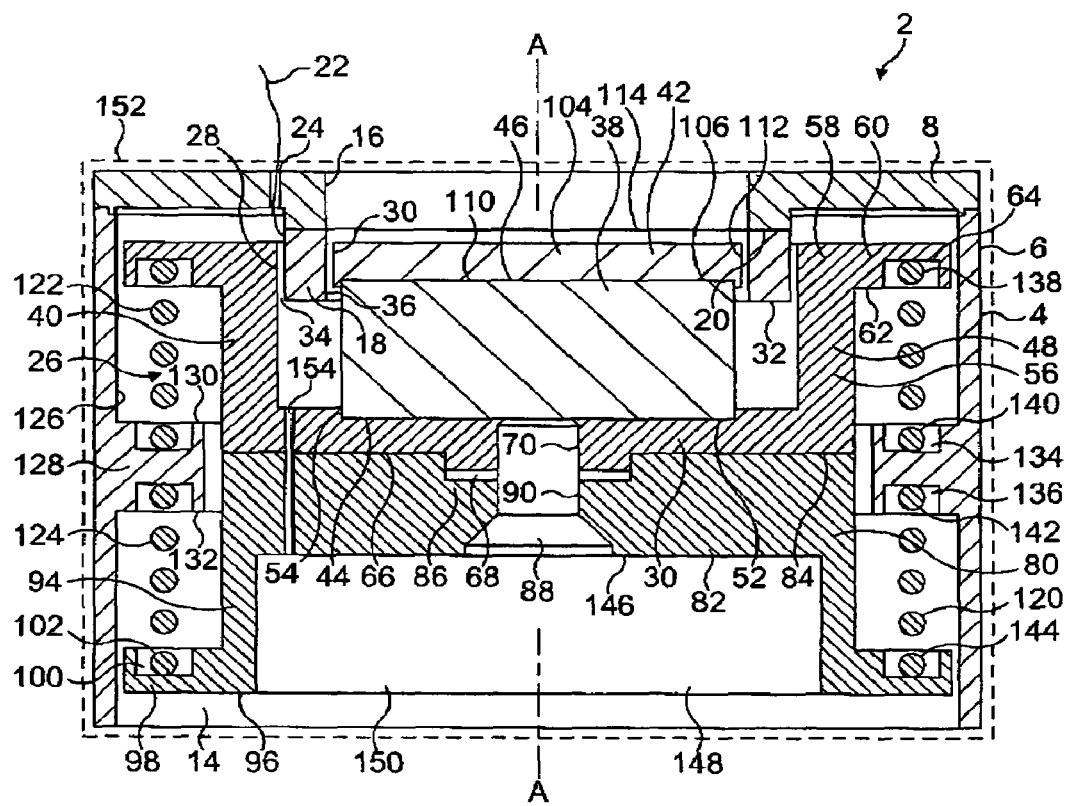
FIG. 2 is a schematic section on line I-I through the electromechanical generator of FIG. 1.

FIGS. 1 and 2 show an electromechanical generator 2 for converting mechanical vibrational energy into electrical energy in accordance with an embodiment of the present invention. 1. The electromechanical generator 2 comprises a housing 4. The housing 4 comprises an outer peripheral wall 6 and a lid 8 which is securely fitted, at corners of the lid 8, to the outer peripheral wall 6 by means of threaded bolts 10. The lid 8 is square and the outer peripheral wall 6 defines a square cross-section outer surface 12 for the housing yet a cylindrical cross-section interior volume 14, having an axis of rotation A-A. A circular opening 16 is formed through the lid 8, which opening is coaxial with the cylindrical cross-section interior volume 14.

An electrically conductive coil 18 is fixedly mounted in the housing 4, and in particular is attached to an inwardly directed surface 20 of the lid 8, so as to extend into the interior volume 14. The coil 18 is circular and is coaxial with the opening 16. The internal diameters of the coil 18 and the opening 16 are substantially identical. The coil 18 has wires 22 extending trough a hole 24 in the lid 8 for connecting to external circuitry (not shown).

A magnet assembly 26 is movably mounted in the housing 4 for linear vibrational motion along the axis A-A. The magnet assembly 26 is rotationally symmetric and has a pair of opposed cylindrical polar surfaces 28, 30 defining an annular gap 32 therebetween. The coil 18 is disposed in the gap 32, so that the outer and inner cylindrical surfaces 34, 36 of the coil 18 are each spaced a small distance, typically less than about 1 mm, from a respective outer or inner cylindrical polar surface 28, 30. The magnet assembly 26 comprises a cylindrical magnet 38, typically a rare earth permanent magnet having a high magnetic field strength, and first and second bodies 40, 42 of ferromagnetic material each having an axis of rotation aligned with the cylindrical axis of the magnet 38. The magnet 38 has opposed poles (i.e. N and S poles) at its planar circular end 44, 46. Each of the first and second bodies 40, 42 of ferromagnetic material is coupled to a respective pole of the magnet 38, with the first body 40 forming one polar surface 28 and the second body 42 forming the other polar surface 30.

The first body 40 of ferromagnetic material is comprised of an upper part 48. The upper part 48 is assembled to a lower support 80, each rotationally symmetric and the upper part 48 and the support 80 being coaxial. The upper part 48 is generally cup-shaped, having a circular bottom wall 50 against an inner surface 52 of which one pole of the magnet 38 is coaxially disposed. A shallow circular recess 54 is provided in the bottom wall 50 to receive the magnet 38. An integral annular wall 56 extends upwardly from the bottom wall 52, and at the upper edge 58 thereof an integral flange 60 extends radially outwardly therefrom. An upper inner circumferential surface of the upper edge 58 defines the polar surface 28. The downwardly directed annular surface 62 of the flange 60 includes an annular recess 64. The outer surface 66 of the bottom wall 52 has a circular abutment 68, coaxial with a threaded blind hole 70.

The support 80 is also generally cup-shaped, but in an opposite inverted orientation to the upper part 48. A circular top wall 82 of the support part 80 has an outer surface 84 adjacent to the outer surface 66 of the bottom wall 52 of the upper part 48. A shallow circular recess 86 is provided in the top wall 82 to receive the circular abutment 68. A threaded screw 88 extends upwardly through a hole 90 in the top wall 82 and is received in the threaded blind hole 70. Accordingly, the screw 88 securely assembles the upper part 48 and the support 80 together. An integral annular wall 94 extends downwardly from the top wall 82, and at the lower edge 96 thereof an integral flange 98 extends radially outwardly therefrom. The upwardly directed annular surface 100 of the flange 98 includes an annular recess 102.

The second body 42 of ferromagnetic material comprises a disc 104 having a shallow recess 106 on its bottom surface 108 into which an upper face 110 of the magnet 38 is received. The outer circumferential surface 112 of the disc 104 forms the polar surface 30. The upper surface 114 of the disc 104 is coplanar with the upper annular surface of the upper edge 58 and flange 60.

The bottom wall 52 of the upper part 48 is thinner than the top wall 82 of the support 80, so that the height (in an axial direction) of the upper part 48 is greater than that of the support 80. This provides that for the magnetic assembly of the first and second bodies 40, 42 of ferromagnetic material and the magnet 38 therebetween, the centre of gravity is substantially located at the mid-height in the axial direction, and most preferably the geometric centre, of the magnetic assembly.

A biasing device 120 mounted between the housing 4 and the magnet assembly 26. The biasing device 120 biases the magnet assembly 26 in opposed directions along the axis towards a central position as shown in FIG. 2, in which the coil 18 is substantially centrally located, in an axial direction, with respect to the two opposed polar surfaces 28, 30.

The biasing device 120 comprises a pair of helical compression springs 122, 124. Each compression spring 122, 124 is axially aligned with the axis A-A and biases the movably mounted magnet assembly 26 in a respective one of the two opposed directions along the axis towards the central position. The two compression springs 122, 124 each apply the same mechanical biasing force against the magnet assembly 26 when the magnet assembly 26 is in equilibrium in the central position. The two compression springs 122, 124 have the same spring constant, the same unbiased length, and are equally compressed when the magnet assembly 26 is in equilibrium in the central position.

However, since the overall spring constant is the sum of the two spring constants, the two compression springs 122, 124 do not need to have the same properties.

The inner surface 126 of the outer peripheral wall 6 of the housing 4 has an integral radially inwardly directed central flange 128. The flange 128 has opposite upwardly and downwardly directed annular surfaces 130, 132, each of which includes a respective annular recess 134, 136.

An upper compression spring 122 has opposite upper and lower ends 138, 140 that are respectively received and seated in the annular channel 64 of the flange 60 and the annular channel 134 of the flange 128. A lower compression spring 124 has opposite upper and lower ends 142, 144 that are respectively received and seated in the annular channel 136 of the flange 128 and the annular channel 102 of the flange 98. The compression springs 122, 124 therefore annularly surrounds at least a part of the magnet assembly 26, which can move axially along the axis A-A when the electromechanical generator 2 is subjected to an applied mechanical force, in particular a mechanical vibration, having at least a component along the axis A-A. The compression springs 122, 124 have a high stiffness in the lateral, i.e. radial, direction so as substantially to prevent non-axial movement of the magnet assembly 26. The seating of the ends 138, 140; 142; 144 of the compression springs 122, 124 within the annular channels of the flanges 60, 98, 128 prevents movement of those ends 138, 140; 142; 144 in the lateral, i.e. radial, direction so as to comprise an additional constraining device for limiting non-axial movement of the magnet assembly 26.

The circular top wall 82 of the second part 80 defines an end face 146 of the magnet assembly 26 remote from the coil 18, the circular top wall 82 and annular wall 94 defining adjacent to the end face 26, a cylindrical cavity 146 that is aligned with, and rotationally symmetric about, the axis A-A.

The housing 4 has an interior volume 150 including a gas. A hermetic seal 152 surrounds the housing 4 for hermetically sealing the interior volume 150 of the housing 4. At least one vent 154 is provided in the magnet assembly 26, extending through the bottom walls 52, 82, for equalization of gas pressure differentials within the housing volume 150 resulting from movement of the magnet assembly 26 along the axis.

The electromechanical generator 2 uses a resonant mass-spring arrangement mounted within the housing 4. If the electromechanical generator 2 is subject to a source of external vibration that causes it to move along the direction A-A, then the magnet assembly 26 comprises an inertial mass which may move relative to the housing 4, also along the direction A-A. In doing so, the length of each of the compression springs 122, 124 is changed, either being compressed or extended respectively, and work is done against a damper comprising the static electrical coil and the movable magnetic assembly that generates a region of magnetic flux within which the electrical coil is disposed. Movement of the electrical coil within the magnetic flux causes an electrical current to be induced in the electrical coil which can be used as a source of electrical power for driving an external device (not shown).

Although in this embodiment the magnet moves relative to the fixed coil, in alternative embodiments the opposite configuration may be employed, with the coil moving relative to the fixed magnet.

Also, although in this embodiment the springs are compression springs, other biasing elements may be employed, such as opposed tension springs.

An electromagnetic generator designed for use as a vibration energy harvester is constructed so that it produces maximum electrical output at a predetermined natural frequency, this corresponding to a frequency of the exciting vibration. For example, if the electromagnetic generator is intended to be coupled to an electrical device vibrating at the frequency of mains electrical power, e.g. 50 Hz, the design natural frequency is also 50 Hz, corresponding to the frequency of the exciting vibration. It is commonly difficult to guarantee the value of the exciting frequency, and so it is necessary to design the electromagnetic generator to achieve a useful power output even if the incoming vibration is off-resonance. The present inventor has confirmed that the electromagnetic transduction efficiency is a very important factor on the achievement of off-resonance power in a vibration energy harvester. In particular, with regard to the spectrum of maximum power that can be extracted from a mass-spring resonator system, the transduction efficiency at off-resonance vibrations can be shown to be even more important for power extraction than for on-resonance vibrations.

The power produced in an external electrical load by a vibration energy harvester with electromagnetic transduction is given by:

$$P_L(\omega) = \frac{a^2 k}{2\omega^2} \frac{r}{(r+1)^2} \frac{1}{\left(\frac{\omega_n^2}{\omega^2}-1\right)^2 + \left(\frac{\omega_n}{\omega Q_{oc}} + \frac{\kappa}{m\omega(r+1)}\right)^2} \quad (1)$$

Where α is the magnitude of the acceleration caused by the sinusoidal vibration component at frequency ω; m is the sprung mass of the resonator and $Q_{oc}$ is the Q-factor of the resonator when the device is open circuit and therefore without useful power extraction. $\omega_n$ is the natural frequency of vibration which is given by:

$$\omega_n = \sqrt{\frac{k}{m}} \quad (2)$$

where k is the spring constant. κ is the electromagnetic transduction efficiency which relates the induced EMF within the coil to it's relative velocity, v, with respect to the mass and magnets:

$$EMF = \sqrt{\kappa R_C} v \quad (4)$$

where $R_C$ is the coil resistance.

The parameter r is the ratio of load resistance to coil resistance:

$$r = \frac{R_L}{R_C} \quad (5)$$

The power in the external load is maximized when r is optimized (impedance matching).

The optimum resistance ratio is given by:

$$r_{optimum}(\omega) = \sqrt{1 + \frac{\frac{\kappa^2}{m^2\omega^2} + \frac{2\omega_n\kappa}{Q_{oc}m\omega^2}}{\left(\frac{\omega_n^2}{\omega^2}-1\right)^2 + \left(\frac{\omega_n}{\omega Q_{oc}}\right)^2}} \quad (6)$$

Figure 3:
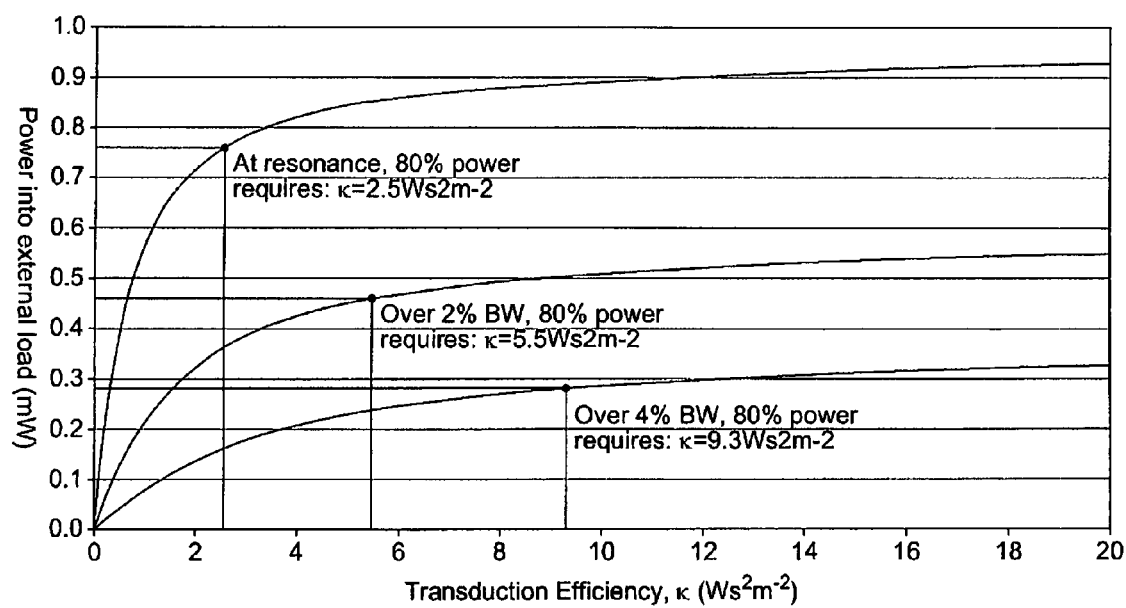
FIG. 3 is a graph showing the relationship between power and transduction efficiency for a theoretical electromechanical generator.

Using the expressions above it is possible to simulate real energy harvester power outputs. A simulated curve of power output versus electromagnetic transduction efficiency is shown in FIG. 3. This curve is calculated for the following device parameters:

| Parameter | Value | Units |
|---|---|---|
| $\omega_n$ | 2π × 50 | Hz |
| a | 0.025 | g |
| $Q_{oc}$ | 100 | — |
| m | 0.2 | kg |
| Rc | 7.5 | kΩ |

In many energy harvesting applications it would be necessary to have the broadest frequency band over which the harvester can produce useful power. The figure shows that to extract 80% of the power available requires higher transduction efficiency across a wider band. A 2% bandwidth (1 Hz around 50 Hz) requires approximately double the transduction efficiency to extract 80% of available power than at resonance. A 4% bandwidth requires roughly double again.

This accordingly shows that it is important to implement the most efficient electromagnetic transduction mechanism possible, given the volume allotted, if a useful bandwidth response is required.

In accordance with embodiments of the present invention, the highest voltage (per ohm) that can be generated from the relative movement of magnet and coil is achieved using an axially-symmetric arrangement.

In addition, a mechanical resonator that does not exhibit a linear spring rate does not exhibit a natural frequency that is independent of amplitude. A resonant vibration energy harvester requires a (near) constant natural frequency. In accordance with embodiments of the present invention, the electromechanical generator provides a new structure to achieve the advantage of achieving a natural frequency that is independent of amplitude, and can exhibit a substantially constant natural frequency.

Figure 4:
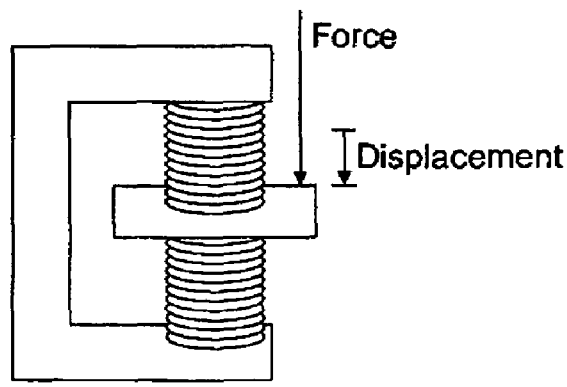
FIG. 4 is a schematic side view of an assembly of a body between two compression springs.
Figure 5:
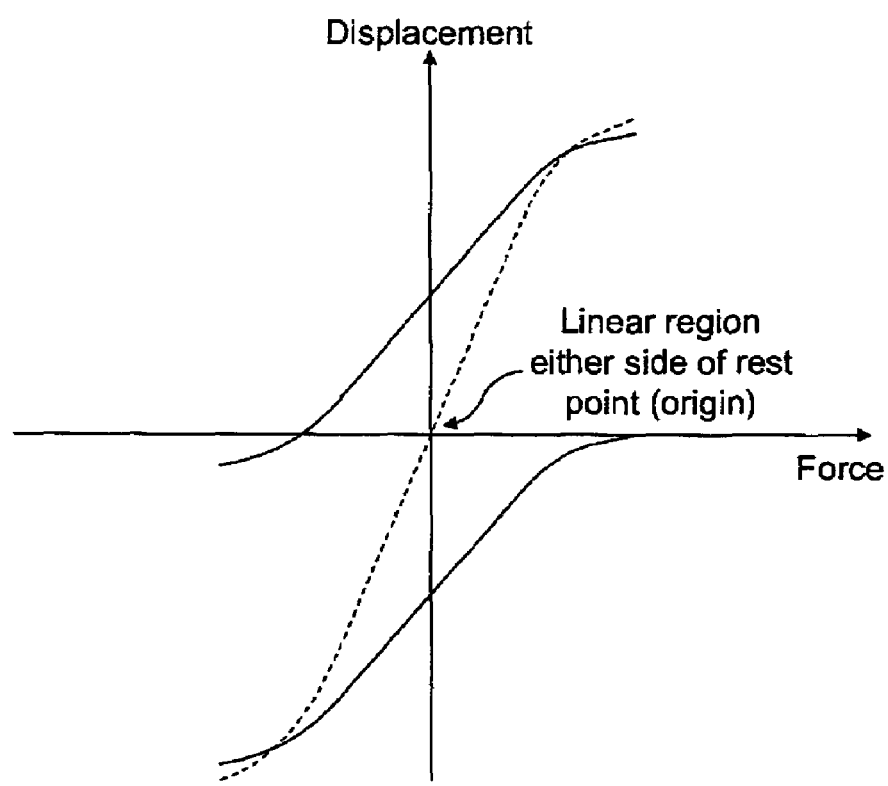
FIG. 5 is a graph showing the relationship between compression and force for the assembly of FIG. 4.

As shown in FIGS. 4 and 5, when a device incorporates a body to be displaced which is disposed between two similar opposed compression springs, at rest the springs are both compressed and thus biased into their linear regions. The resulting spring rate around the origin is therefore linear, and the sum of the individual spring rates.

Figure 6:
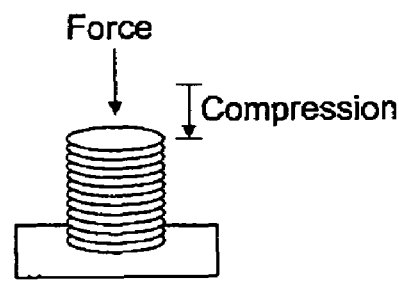
FIG. 6 is a schematic side view of an assembly of a body adjacent a single spring.
Figure 7:
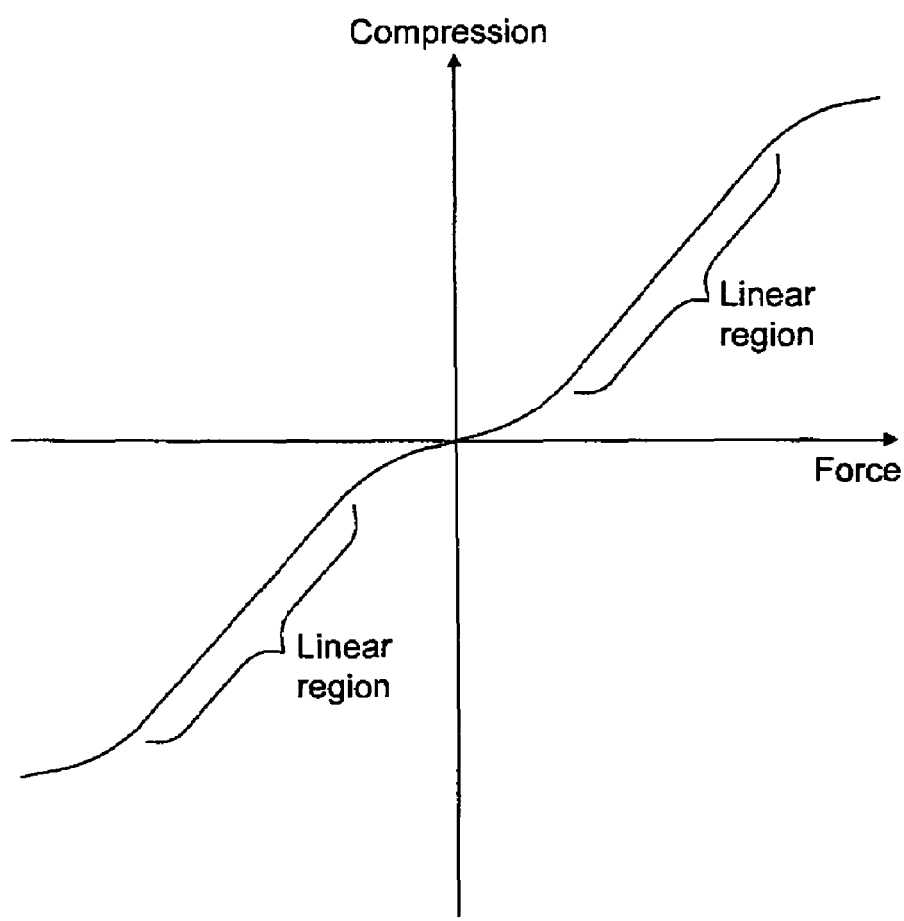
FIG. 7 is a graph showing the relationship between compression and force for the assembly of FIG. 6.

In contrast, as shown in FIGS. 6 and 7, when a device incorporates a body to be displaced which is connected to a single spring (tension or compression), at rest the spring is not biased into its linear region. The resulting spring rate around the origin is therefore non-linear. Therefore, the natural frequency would be dependent on amplitude, and so would not be constant unless the amplitude was constant. In practice, an electromechanical generator when used as an energy harvester is subjected to varying amplitude, and not a constant amplitude. Under such conditions, the natural frequency would vary.

Figure 8:
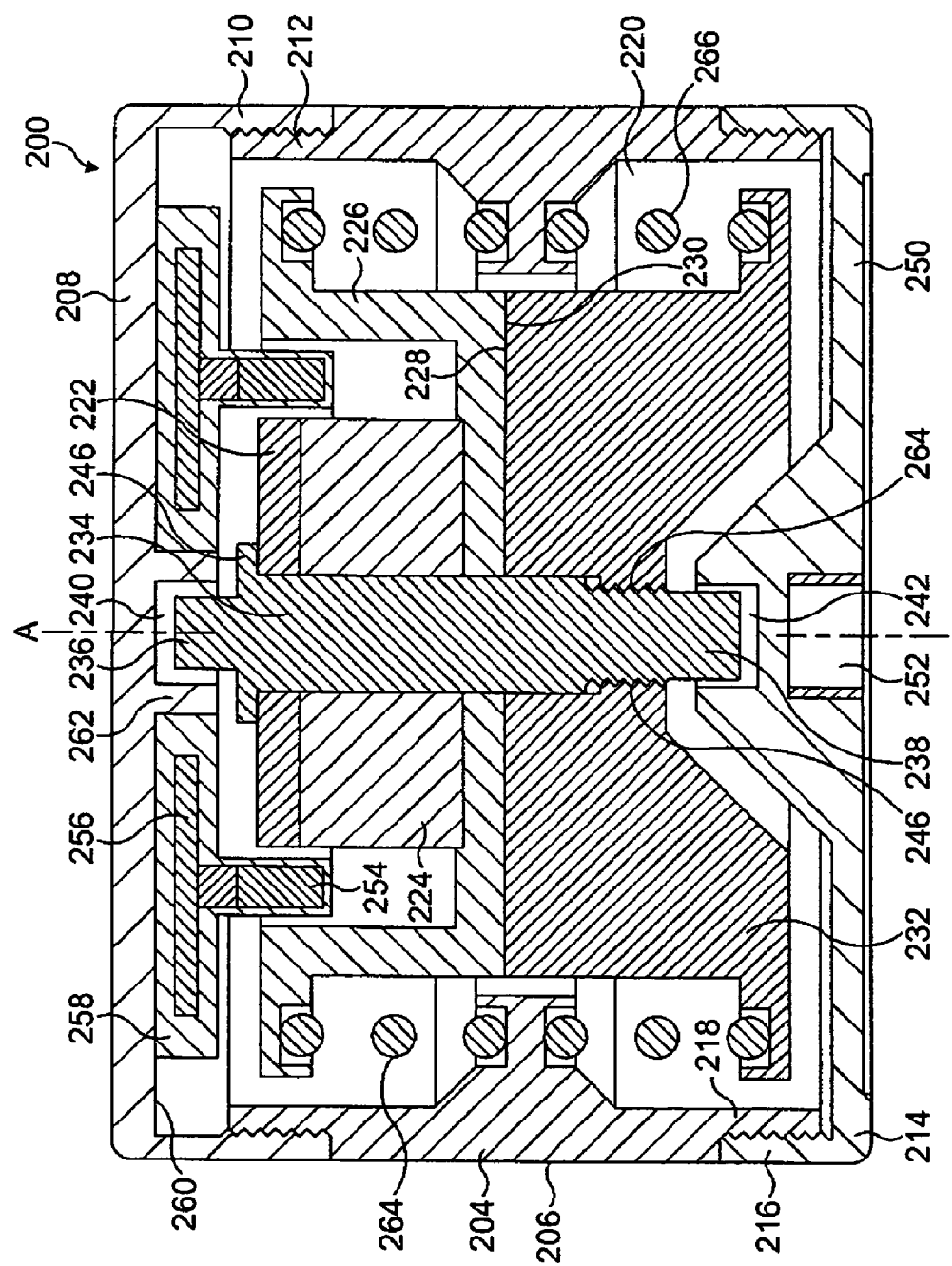
FIG. 8 is a schematic section, similar to FIG. 2, of an electromechanical generator for converting mechanical vibrational energy into electrical energy in accordance with a second embodiment of the present invention.

A second embodiment of an electromechanical generator 200 in accordance with the invention is illustrated in FIG. 8. This embodiment is modified as compared to the first embodiment in a number of respects.

The housing 204 has a cylindrical outer surface 206. The lid 208 is not provided with a central opening. The lid 208 has an outer flange 210 that is threadably coupled to an upper flange 212 of the housing 204. A base 214 is additionally provided that has an outer flange 216 that is threadably coupled to a lower flange 218 of the housing 204. The threaded couplings are hermetically sealed. In this way the entire internal volume 220 of the electromechanical generator 200 is hermetically sealed. Other couplings, apart from threaded couplings, may be used.

The second body 222 of ferromagnetic material has the same external radius as that of the magnet 224. The first body 226 of ferromagnetic material has a planar bottom surface 228 adjacent a planar top surface 230 of support 232. An axle 234, disposed along the axis A-A, aligns and fixes together the second body 222 of ferromagnetic material, the magnet 224, the first body 226 of ferromagnetic material and the support 232. Upper and lower ends 236, 238 of the axle 234 are received, for friction free longitudinal movement, within respective upper and lower cavities 240, 242 in the lid 208 and base 214 respectively. This interrelationship between the axle 234 and the cavities 240, 242 mechanically limits any lateral movement of the magnet assembly. The axle 234 includes a threaded end 244 threadably received in a bore 246 in the support 232 and a radially enlarged head 246 bearing against the upper surface of the second body 222 of ferromagnetic material. The outer face 250 of the base 214 is provided with a threaded blind hole 252 for mounting the device to a mount (not shown) or the vibrating device (not shown) from which the energy is to be harvested.

The coil 254 is electrically connected to an annular circuit board 256. The circuit board 256 includes electrical circuitry to control the electrical output of the coil 254, for example to limit the maximum output voltage. The plane of the circuit board 256 is orthogonal to the axial direction of the coil 254. Both the coil 254 and the annular circuit board 256 are encapsulated within an annular body 258, for example of cast plastic resin, which is fixed to the inner surface 260 of lid 208 and surrounds the an annular wall 262 surrounding upper cavity 240 in the lid 208. This provides a very compact and durable structure for the coil and its associated circuit board, providing an electrical structure that has high intrinsic safety and reliability, coupled with ease of manufacturing.

In this embodiment, typically the lid 208, housing 204 and base 214 are composed of aluminum that can readily be machined to the desired shape and dimensions. The magnet 224 is typically composed of NdFeB. The first and second bodies 226, 222 of ferromagnetic material are composed of iron, and the support 232 is composed of a dense metal, such as a tungsten alloy. As in the first embodiment, opposed helical compression springs 264, 266 bias the magnet assembly, comprising the second body 222 of ferromagnetic material, the magnet 224, the first body 226 of ferromagnetic material and the support 232 all assembled together by the axle 234, towards a central position.

This embodiment provides a hermetically sealed device that has high intrinsic safety and can be readily manufactured using conventional machining operations, for example.

The construction of the electromechanical generator of the present invention provides a number of significant technical advantages over known electromechanical generators.

First, by providing an axially linear movement of the magnet assembly relative to the coil, the magnetic coupling therebetween can be maximized. In contrast, when the spring comprises a cantilever beam, as in known electromechanical generators used as energy harvesting devices, the relative movement of the magnet assembly and the coil is not linear, but is along a curve, which reduces the magnetic coupling therebetween, and so reduces electrical output.

Second, by providing compression springs having high lateral stiffness, and being securely seated at their ends against translational movement, the relative linear motion of the magnet assembly relative to the coil is ensured, and lateral motion prevented. By preventing lateral motion, the pole surfaces can be located very close to the coil, for example less than 1 mm, and this in turn provides a maximum flux density between the pole pieces that is cut by the coil when the magnet assembly is vibrated.

Third, by providing opposed compression springs which positively bias the magnet assembly, in opposite directions, about a central equilibrium position, the electromechanical generator can be used in any orientation. The magnet assembly is vibratable about the central position against the bias of the springs in any angular orientation, and the vibration characteristics and performance are independent of orientation. This is a fundamental difference from some known electromechanical generators and provides significant practical advantages thereover.

Fourth, by providing opposed compression springs which positively bias the magnet assembly, in opposite directions, about a central equilibrium position, the electromechanical generator provides maximum cutting of magnetic flux by the coil. In the central position, the cutting of the magnetic flux is at a maximum.

Fifth, a resonant vibration energy harvester in the form of an electromechanical generator requires a predetermined and substantially constant natural frequency. In the electromechanical generator of the present invention, the compression springs are compressed/expanded about a central compressed position, which increases the linearity of their compression/expansion characteristics, in particular the spring rate. This provides that the natural frequency is substantially independent of amplitude of the vibration of the magnet assembly. Furthermore, the compression spring characteristics are more likely to be constant over the operating lifetime of the device, thereby increasing the performance of the electromechanical generator.

Sixth, the mass of the magnet assembly can be made to be very high relative to the size of the device, thereby to increase the overall mass density of the device as compared, for example, to a cantilever device. For a given volume to be occupied by the device, a greater moving mass can be provided. This also maximizes the electrical power output, for the reasons stated above.

These advantages together contribute to the electromechanical generator of the present invention being capable of producing an output voltage of 50 volts (with a peak to peak voltage of 200 volts) from an input vibration of about 50 Hz as a result of the electromechanical generator (having typical external dimensions of 50 mm square and 50 mm high) being mounted on, for example, a housing of an electrical pump from which vibration energy is to be harvested. By increasing the electrical output, as a result of increased magnetic coupling, the operating band width of the device can be greatly increased. This in turn greatly enhances the ability of the device to be used in many new energy harvesting applications.

Seventh, the mass of the magnet assembly affects the natural frequency of the electromechanical generator. There is a need to control the moving mass of an electromechanical generator in order to tune the electromechanical generator to the desired natural frequency, which is the frequency of the vibrations to which the device is designed to be subjected to in the field when harvesting energy from a vibrating body. By providing an exposed end face of the magnet assembly, the end face, typically of a metal such as stainless steel, can readily be machined by a machine tool such as a lathe, so as to remove excess material from the magnet assembly, and thereby reduce its mass. Cutting away a surface of the end face to a desired depth enlarges the rotationally symmetric cavity therebelow. Since at least the second part of the first body is rotationally symmetric, that part can readily be machined on a lathe. The ability to machine the parts of the magnet assembly so as to manufacture them and control their mass is another significant technical advantage as compared, for example, to electromechanical generators employing a cantilever beam. The production costs can be significantly reduced.

Eighth, simple compression springs can be employed in the electromechanical generator. They do not need to be joined to any other part. The ends can merely be detachably seated in the respective annular channels, and located around the outside of the movable magnet assembly. Each compression spring is detachably mounted under the action of its own bias. This provides a reliable and simple structure to prevent lateral movement on the magnet assembly, with low friction and avoiding complicated, intricate and/or expensive manufacturing techniques. The resultant structure is robust and compact.

Ninth, electromechanical generators have a need sometimes to be used in potentially flammable environments, such as on oil drilling platforms. In such environments it is absolutely crucial that the safety of the installation is not compromised by inadvertent electrical sparking from the electromechanical generator, particularly when the electromechanical generator is capable of producing a high output voltage. By providing a hermetic seal around the entire electromechanical generator, this prevents any ingress of an inflammable vapor into the electromechanical generator. An inert gas may be hermetically sealed within the electromechanical generator. Alternatively, the volume within the housing may be partially or wholly evacuated.

In the illustrated embodiment, the coil is static and the magnet is dynamic. An advantage of this arrangement is that electrical connections to the coil are easier to establish and more reliably maintained if the coil is static. However, in alternative embodiments of the present invention, the opposite configuration may be employed, with the coil being dynamic and the magnet being static.

Other modifications and embodiments of the present invention will be apparent to those skilled in the art. For example, in the illustrated embodiment, one or more bearings may be provided between the moving element and the housing for guiding the vibratory motion of the moving element; the magnet may have other than circular cross-section; the magnet assembly and coil may have other than a rotationally symmetric structure about the axis; and/or the biasing device may comprise other than compression springs.

What is claimed is:

1. An electromechanical generator for converting mechanical vibrational energy into electrical energy, the electromechanical generator comprising a housing, an electrically conductive coil fixedly mounted in the housing, a magnet assembly movably mounted in the housing for linear vibrational motion along an axis, the magnet assembly having a pair of opposed polar surfaces defining a gap therebetween, the coil being disposed in the gap, electrical circuitry for controlling the output of the electrically conductive coil, the electrical circuitry being electrically connected to the coil, an annular body of cast resin surrounding and encapsulating within the resin the electrically conductive coil and the electrical circuitry connected thereto, and a biasing device mounted between the housing and the magnet assembly, the biasing device biasing the magnet assembly in opposed directions along the axis towards a central position.

2. An electromechanical generator according to claim 1 wherein the biasing device comprises a pair of springs, each spring being axially aligned with the axis and biasing the movably mounted magnet assembly in a respective one of the two opposed directions along the axis towards the central position.

3. An electromechanical generator according to claim 2 wherein the springs comprise compression springs.

4. An electromechanical generator according to claim 1 wherein the biasing device annularly surrounds at least a part of the magnet assembly.

5. An electromechanical generator according to claim 1 wherein the biasing device is adapted substantially to prevent non-axial movement of the magnet assembly.

6. An electromechanical generator according to claim 1 further comprising a constraining device for limiting non-axial movement of the magnet assembly.

7. An electromechanical generator according to claim 1 wherein the magnet assembly comprises a cylindrical magnet, and first and second bodies of ferromagnetic material each having an axis of rotation aligned with the cylindrical axis of the magnet and each being coupled to a respective pole of the magnet, the first body forming one polar surface and the second body forming the other polar surface.

8. An electromechanical generator according to claim 7 wherein the magnet assembly further comprise a support aligned with the axis and mounted to the first body on a face thereof remote from the magnet, and the biasing device comprises first and second compression springs biasing the magnet assembly in opposed directions along the axis, the first compression spring being mounted between the first body and the housing and the second compression spring being mounted between the support and the housing.

9. An electromechanical generator according to claim 8 wherein the housing includes a flange having opposite annular surfaces against which the first and second compression spring respectively abut.

10. An electromechanical generator according to claim 8 wherein each compression spring has two opposed ends and each end is detachably seated in a respective annular channel of the housing or the support.

11. An electromechanical generator according to claim 7 wherein the cylindrical magnet is received in a cavity in the first body and a first pole thereof is adjacent a bottom wall of the cavity, the second body is mounted on a second pole of the cylindrical magnet, and the gap is annular and defined between an inner cylindrical surface of the cavity and an outer cylindrical surface of the second body.

12. An electromechanical generator according to claim 1 wherein the biasing device is detachably mounted between the housing and the magnet assembly.

13. An electromechanical generator according to claim 1 wherein the magnet assembly is rotationally symmetric about the axis.

14. An electromechanical generator according to claim 1 wherein the magnet assembly has an end face remote from the coil, the end face including a cavity that is aligned with, and rotationally symmetric about, the axis.

15. An electromechanical generator according to claim 1 wherein the housing has an interior volume including a gas, and further comprising a hermetic seal surrounding the housing for hermetically sealing the interior volume of the housing, and at least one vent in the moving element for equalization of gas pressure differentials within the housing volume resulting from movement of the magnet assembly along the axis.

16. An electromechanical generator for converting mechanical vibrational energy into electrical energy, the electromechanical generator comprising an electrically conductive coil, a magnet assembly, the magnet assembly having a pair of opposed polar surfaces defining a gap therebetween, the coil being disposed in the gap, the coil being fixed and the magnet assembly being movably mounted for linear vibrational motion along an axis, and a pair of springs, each spring being axially aligned with the axis and biasing the movably mounted magnet assembly in a respective one of two opposed directions along the axis towards a central position, the springs being adapted substantially to prevent non-axial movement of the magnet assembly, and wherein the springs and the movably mounted magnet assembly comprise a mechanical resonator having a natural frequency and the springs establish a linear spring rate on opposite sides of the central position for biasing the movably mounted magnet towards the central position, further wherein the magnet assembly comprises a cylindrical magnet, and first and second bodies of ferromagnetic material each having an axis of rotation aligned with the cylindrical axis of the magnet and each being coupled to a respective pole of the magnet, the first body forming one polar surface and the second body forming the other polar surface, and wherein the magnet assembly further comprises a support aligned with the axis and mounted to the first body on a face thereof remote from the magnet, and the springs comprise first and second compression springs biasing the magnet assembly in opposed directions along the axis, the first compression spring being mounted between the first body and a flange and the second compression spring being mounted between the support and the flange.

17. An electromechanical generator according to claim 16 wherein the springs comprise compression springs.

18. An electromechanical generator according to claim 16 wherein the springs annularly surround at least a part of the magnet assembly.

19. An electromechanical generator according to claim 16 further comprising a constraining device for limiting non-axial movement of the magnet assembly.

20. An electromechanical generator according to claim 16 wherein the flange has opposite annular surfaces against which the first and second compression spring respectively abut.

21. An electromechanical generator according to claim 20 wherein each compression spring has two opposed ends and each end is detachably seated in a respective annular channel of the flange or the support.

22. An electromechanical generator according to claim 16 wherein the cylindrical magnet is received in a cavity in the first body and a first pole thereof is adjacent a bottom wall of the cavity, the second body is mounted on a second pole of the cylindrical magnet, and the gap is annular and defined between an inner cylindrical surface of the cavity and an outer cylindrical surface of the second body.

23. An electromechanical generator according to claim 16 wherein the biasing device is detachably mounted between the flange and the magnet assembly under the action of its own bias.

24. An electromechanical generator according to claim 16 wherein the magnet assembly is rotationally symmetric about the axis.

25. An electromechanical generator according to claim 16 wherein the magnet assembly has an end face remote from the coil, the end face including a cavity that is aligned with, and rotationally symmetric about, the axis.

26. An electromechanical generator according to claim 16 further comprising a housing containing the magnet assembly and the coil, the housing having an interior volume including a gas, and a hermetic seal surrounding the housing for hermetically sealing the interior volume of the housing, and at least one vent in the moving element for equalization of gas pressure differentials within the housing volume resulting from movement of the magnet assembly along the axis.

27. An electromechanical generator for converting mechanical vibrational energy into electrical energy, the electromechanical generator comprising a housing, the housing having an interior volume including a gas, an electrically conductive coil mounted in the housing, a magnet assembly mounted in the housing, the magnet assembly having a pair of opposed polar surfaces defining a gap therebetween, the coil being disposed in the gap, the coil and magnet assembly being mounted for relative linear vibrational motion therebetween along an axis, a biasing device within the housing biasing a moving element, comprising at least one of the coil and the magnet assembly, in opposed directions along the axis towards a central position, electrical circuitry for controlling the output of the electrically conductive coil, the electrical circuitry being electrically connected to the coil, an annular body of cast resin surrounding and encapsulating within the resin the electrically conductive coil and the electrical circuitry connected thereto, and a hermetic seal for hermetically sealing the interior volume of the housing.

28. An electromechanical generator according to claim 27 further comprising at least one vent in the moving element for equalization of gas pressure differentials within the housing volume resulting from movement of the moving element assembly along the axis.

29. An electromechanical generator according to claim 27 wherein the hermetic seal surrounds the housing.

30. An electromechanical generator according to claim 27 wherein the housing comprises a plurality of parts assembled together to form an assembly, adjacent parts of the assembly being hermetically sealed by the hermetic seal.

31. An electromechanical generator according to claim 27 wherein the magnet assembly is movably mounted and the coil is fixed to the housing.

32. An electromechanical generator according to claim 31 wherein the biasing device comprises a pair of compression springs, each spring annularly surrounding at least a part of the magnet assembly, and each spring being axially aligned with the axis and biasing the movably mounted magnet assembly in a respective one of the two opposed directions along the axis towards the central position.

33. An electromechanical generator according to claim 31 further comprising a constraining device for limiting non-axial movement of the magnet assembly.

34. An electromechanical generator according to claim 31 wherein the magnet assembly comprises a cylindrical magnet, first and second bodies of ferromagnetic material each having an axis of rotation aligned with the cylindrical axis of the magnet and each being coupled to a respective pole of the magnet, the first body forming one polar surface and the second body forming the other polar surface, and a support aligned with the axis and mounted to the first body on a face thereof remote from the magnet, and the compression springs comprise first and second compression springs biasing the magnet assembly in opposed directions along the axis, the first compression spring being mounted between the first body and a flange and the second compression spring being mounted between the support and the flange.

\* \* \* \* \*